United States Patent [19]
Diamond

[11] 3,841,819
[45] Oct. 15, 1974

[54] VACUUM FORMING MACHINE MODULAR CLAMPING FRAMES

[75] Inventor: Harvey J. Diamond, Charlotte, N.C.

[73] Assignee: Plasti-Vac Inc., Charlotte, N.C.

[22] Filed: Oct. 3, 1972

[21] Appl. No.: 294,660

[52] U.S. Cl. ............... 425/388, 269/88, 269/121, 269/142, 425/DIG. 48
[51] Int. Cl. .......................................... B29c 17/00
[58] Field of Search ............ 269/111, 121, 88, 140, 269/141, 142; 425/193, DIG. 48, 388, 383; 269/208

[56] References Cited
UNITED STATES PATENTS

| | | | |
|---|---|---|---|
| 942,180 | 12/1909 | McBee | 269/208 |
| 2,604,352 | 7/1952 | Gonser | 269/208 X |
| 2,907,069 | 10/1959 | Butzko | 425/388 X |
| 3,018,098 | 1/1962 | Hunt | 269/208 X |
| 3,133,314 | 5/1964 | Arnould | 425/160 X |
| 3,287,765 | 11/1966 | Puents | 425/DIG. 48 |
| 3,599,959 | 8/1971 | Asenbauer | 425/DIG. 48 |
| 3,659,991 | 5/1972 | Diamond | 425/388 X |

*Primary Examiner*—Richard B. Lazarus
*Attorney, Agent, or Firm*—Parrott, Bell, Seltzer, Park & Gibson

[57] ABSTRACT

Upper and lower main clamping frames, for clamping a sheet of plastic material therebetween, are provided with modular rails readily positionable at various locations within the main clamping frames to accommodate plastic sheets of substantially smaller size than the size of the clamping frames.

7 Claims, 15 Drawing Figures

VACUUM FORMING MACHINE MODULAR CLAMPING FRAMES

This invention relates to vacuum forming machines of the type having a die over which a heated plastic sheet is draped and is caused to conform by suction to produce predetermined contoured relief configurations in the plastic sheet. The invention is especially concerned with an improved clamping frame assembly for accommodating plastic sheets of different sizes.

Heretofore, a clamping frame assembly has been proposed for accommodating various sizes of plastic sheets, as disclosed, for example, in U.S. Pat. No. 3,133,314, issued May 19, 1964, to Arnould et al., and wherein internal frame members are joined by tongue-and-groove connections to the main frame members of the clamping frames to divide the clamping frames into smaller areas. Because of the tongue-and-groove connections, difficulties are encountered in assembling and disassembling the internal frame members, and adjusting the same, relative to the main frame members of the clamping frames.

It is therefore an object of this invention to provide an improved clamping frame assembly for a vacuum forming machine wherein the assembly is divided into smaller areas by novel modular rails which are more readily installed in, removed from, and adjusted in the substantially rectangular main clamping frames of the assembly than is the case with clamping frame assemblies proposed heretofore.

It is a more specific object of the invention to provide a clamping frame assembly of the type described, wherein the main frames thereof and the modular rails are so constructed that one end of a modular rail is matingly releasably connected at a desired location to one of the main rails of a clamping frame, and the other end of the modular rail is connected to the opposite main rail of the respective clamping frame by a movable latch means or plunger adapted to fit in any one of a plurality of cavities or holes provided in the said opposite main rail.

Some of the objects of the invention having been stated, others will appear as the description proceeds when taken in connection with the accompanying drawings, in which.

Figure 1:
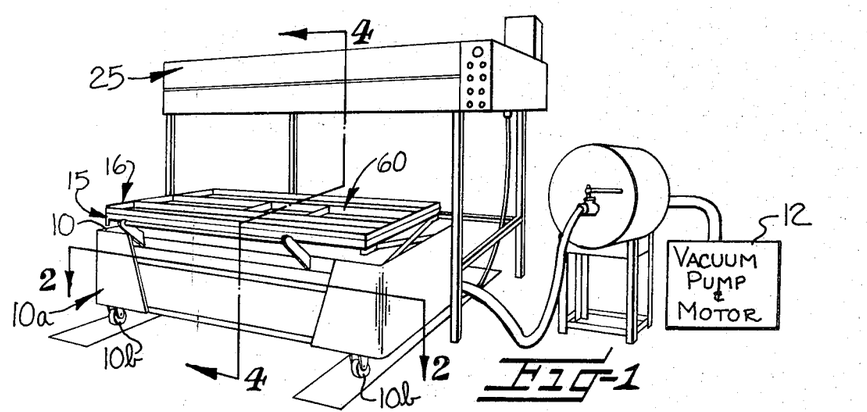
FIG. 1 is a perspective view of the vacuum forming machine with the novel clamping frame assembly occupying a lowered operative position.

Referring more specifically to the drawings, the vacuum forming machine comprises a vacuum table 10 on which a suitable perforate or pervious forming die 11 (FIGS. 4 and 5) is mounted, and to which suction is applied by a suitable suction device 12 (FIG. 1). The suction is applied to die 11 whenever a heated sheet of plastic material S (FIGS. 5–8 and 13) is draped or deposited over the die 11 by means of a vertically movable clamping frame assembly of novel construction.

The clamping frame assembly includes a pair of open, lower and upper, substantially rectangular main clamping frames broadly designated at 15, 16. Lower main clamping frame 15 generally comprises a pair of longitudinal or front and rear main frame members or rails 21, 22 and a pair of opposing transverse side frame members or side rails 23, 24 suitably secured, as by welding to corresponding ends of the main longitudinal frame members 21, 22. Upper main clamping frame 16 comprises rails 21a–24a, in the form of angle bars, which complement and normally overlie the respective lower rails 21–24. Rails 21–24 are preferably of tubular, square or other polygonal cross-section.

Figure 4:
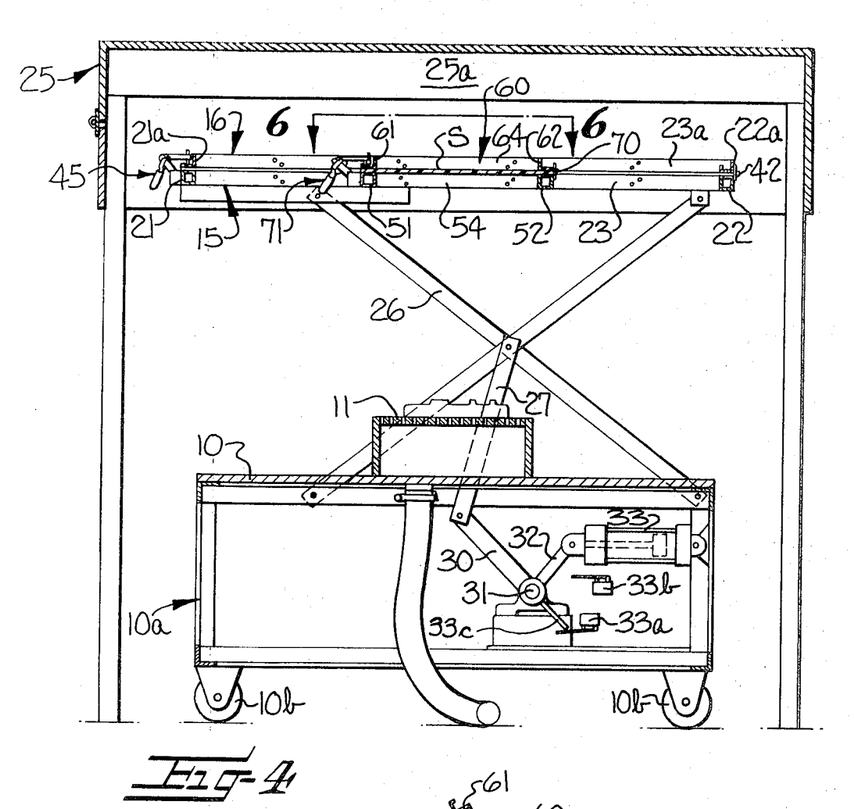
FIG. 4 is an enlarged vertical sectional view taken substantially along line 4—4 in FIG. 1 and showing the clamping frame assembly in a raised position within a heating chamber.
Figure 5:
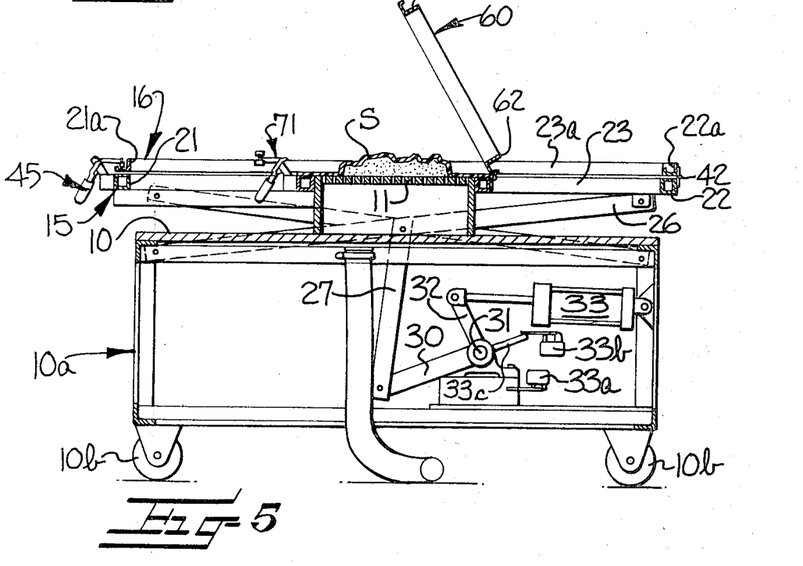
FIG. 5 is a view similar to FIG. 4 but omitting the heating chamber and showing the clamping frame assembly in a lowered operative position.

Vacuum table 10 is mounted on a suitable box-like frame or truck broadly designated at 10a and which may be supported on wheels 10b. Spaced a substantial distance above table 10, as shown in FIGS. 1 and 4, is an open-bottomed heating chamber or oven generally designated at 25 and provided with a suitable heating means 25a in the upper portion thereof for heating the plastic sheet S when the clamping frame assembly is elevated into oven 25. In order to raise and lower clamping frames 15, 16, the upper ends of the crossed links of a lazy-tong linkage 26 are connected to each of the opposing main side rails 23, 24 of the lower clamping frame 15.

The lower end of the lazy-tong linkage 16 at each side of the apparatus is slidably connected to the corresponding sides of the box-like frame 10a of table 10, and medial portions of each lazy-tong linkage 16 are connected by a corresponding link 27 to a crank 30 fixed on a rocker shaft 31. The connections between lower clamping frame 15 and shaft 31 may be as disclosed in my commonly owned copending application Ser. No. 234,060, filed Mar. 13, 1972 now Pat. No. 3,814,562, and entitled VACUUM FORMING APPARATUS AND METHOD, to which reference is made for a more detailed disclosure.

Rocker shaft 31 is suitably journaled in a box-like frame 10a and also has a crank 32 connected thereto, to which one end of a piston rod of a suitable ram or piston-and-cylinder assembly 33 is pivotally connected (FIGS. 2, 3, 4 and 5). The cylinder of ram 33 is pivotally connected to frame 10a and is controlled by a suitable valve mechanism 35 (FIG. 3) for alternatively introducing fluid pressure into opposite ends of the cylinder of ram 33. It is apparent by referring to FIGS. 4 and 5 that, upon fluid pressure being introduced into the left-hand end of the cylinder of ram 33, the piston rod is retracted to rotate shaft 31 in a clockwise direction to raise the clamping frame assembly to the upper operative position of FIG. 4. Conversely, when fluid pressure is delivered into the right-hand end of the cylinder of ram 33, it is apparent that counterclockwise rotation is imparted to shaft 31 to return the clamping frame assembly to the lowered operative position shown in FIG. 5.

Figures 2, 3:
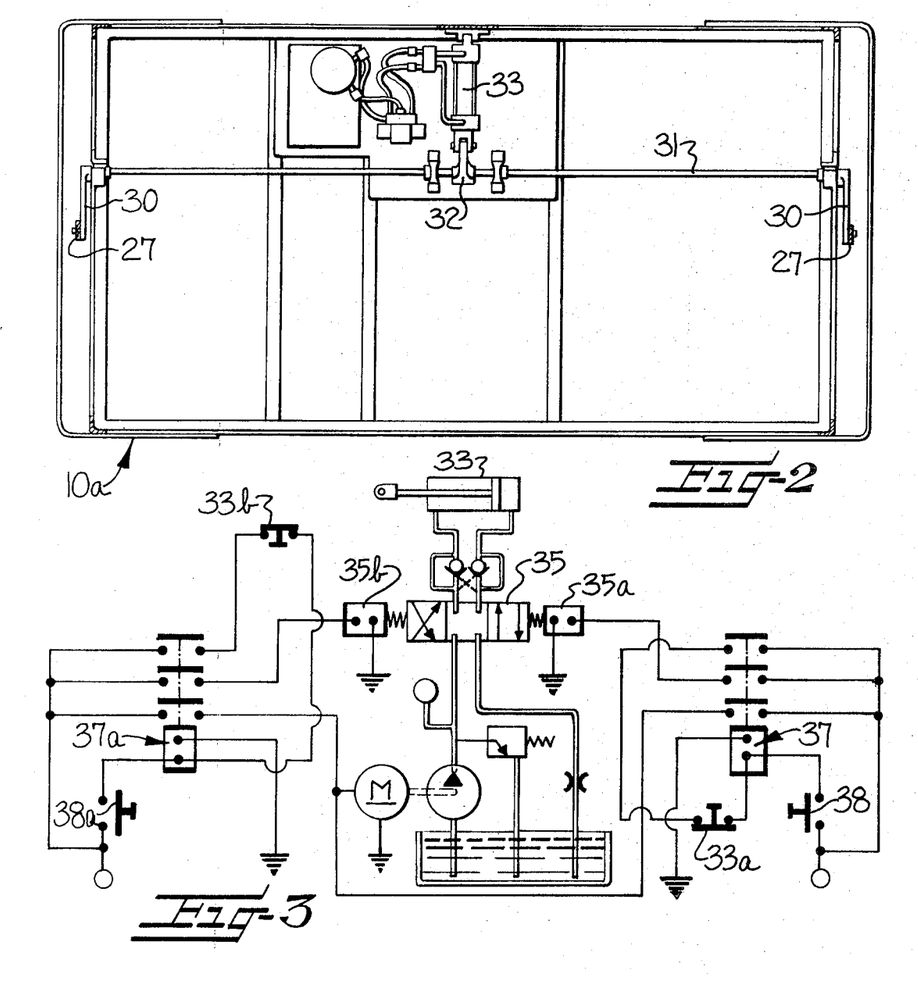
FIG. 2 is an enlarged sectional plan view showing improved means for raising and lowering the clamping frame assembly and taken substantially along line 2—2 in FIG. 1.
FIG. 3 is a schematic view of a suitable electrical circuit for controlling the fluid-operated means for raising and lowering the clamping frame assembly.

Suitable switches 33a, 33b are interposed in an electrical circuit for controlling the valve means 35 to limit the extent of the respective upward and downward movements of the clamping frame assembly, the switches 33a, 33b being actuated by a suitable actuator 33c carried by shaft 31. As shown in FIG. 3, limit switches 33a, 33b are normally closed for energizing respective relays 37, 37a which, when energized or actuated, are operable to complete respective electrical circuits to solenoid valve components 35a, 35b of valve means 35 for effecting the desired direction of the flow of fluid through ram 33. Relays 37, 37a are normally inactive and are energized by respective normally open, manually operable, start switches 38, 38a, which thus effect respective upward and downward movements to clamping frames 15, 16.

The lower and upper main clamping frames 15, 16 of the clamping frame assembly may be constructed in substantially the manner described in my U.S. Pat. No. 3,659,991 dated May 2, 1972, to which reference is made for a more detailed description thereof. In other words, the two rear main longitudinal rails 22, 22a of clamping frames 15, 16 are pivotally interconnected, as by a longitudinally extending hinge 42. As shown in the left-hand portions of FIGS. 4 and 5 and the lower portion of FIG. 8, a plurality of hand-operated clamps 45 are carried by the lower clamping frame 15 to firmly close the two clamping frames 15, 16 together and thereby securely retain therebetween a plastic sheet which could then be of such size as to correspond substantially to the overall size of main rectangular frames 15, 16. However, in order to adapt the clamping frames 15, 16 to accommodate plastic sheets of substantially smaller size than that of the main clamping frames, according to the present invention, each of the main clamping frames is provided with a plurality of removable and displaceable modular structural members which are adapted to fit in various positions within the confines of the respective clamping frames 15, 16.

The modular structural members carried by the main upper clamping frame 15 complement and overlie those modular structural members carried by the main lower clamping frame 16, but the upper modular structural members are in the form of angle bars while the lower modular structural members are in the form of opposite tubes which are rectangular in cross-section, as is preferred. The lower modular structural members collectively form a lower auxiliary clamping frame, broadly designated at 50 (FIG. 13), and include spaced, substantially parallel, longitudinal front and rear modular rails 51, 52 which are spanned by at least one right-hand transverse lower modular rail 53 and at least one left-hand transverse lower modular rail 54. The upper modular structural members collectively form an upper auxiliary clamping frame broadly designated at 60 and include upper front, rear and transverse modular rails 61–64 which complement the lower modular rails 51–54.

Figures 13, 14, 15:
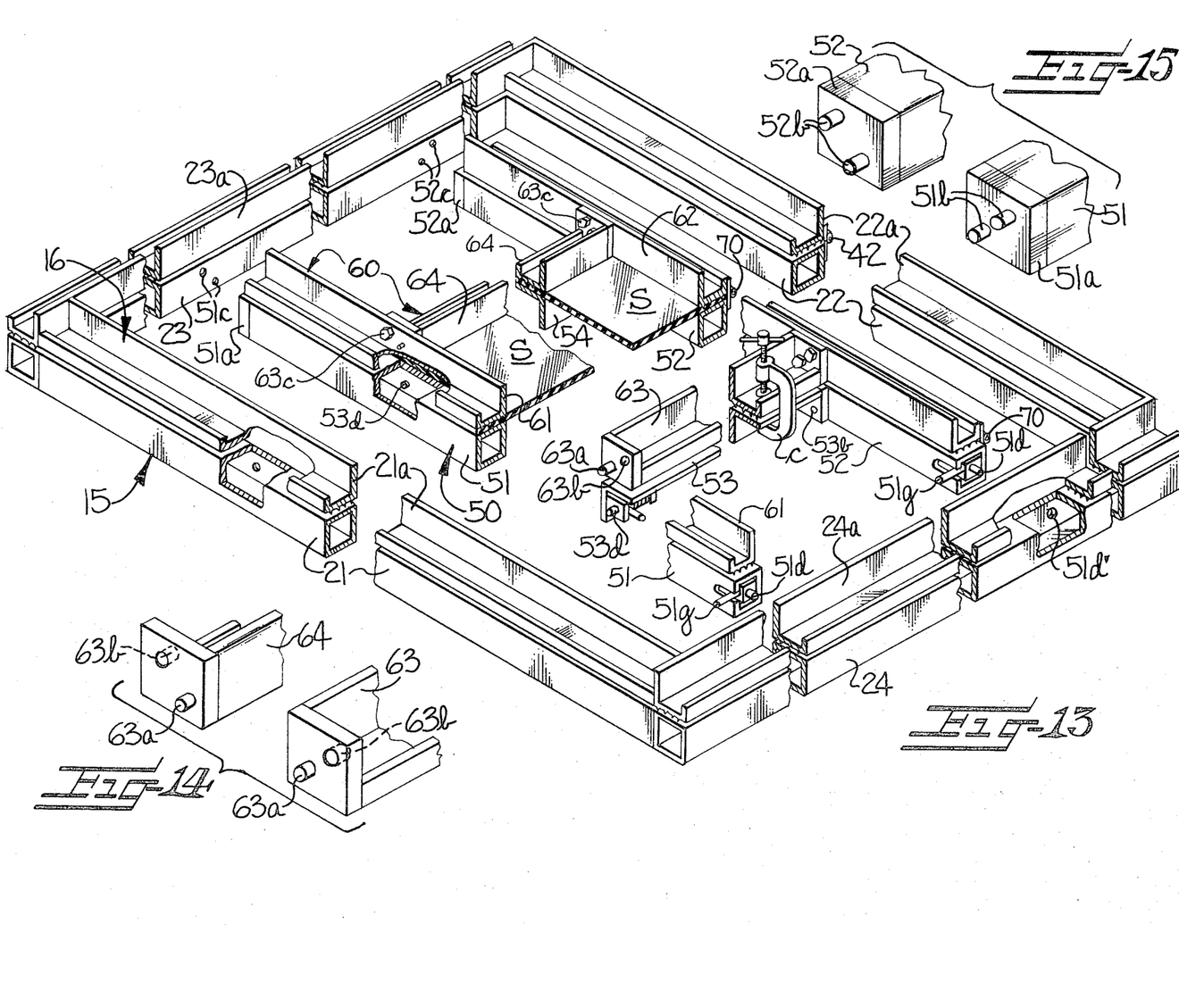
FIG. 13 is an enlarged perspective and partially exploded view of the clamping frame assembly of FIG. 8 with some parts broken away and others omitted for purposes of clarity.
FIG. 14 is an enlarged perspective view of corresponding end portions of the two upper transverse modular rails 63, 64 shown in the central portions of FIGS. 6, 8 and 13.
FIG. 15 is an enlarged perspective view of the left-hand end portions of the lower front and rear auxiliary or modular rails 51, 52 in FIG. 13.

Corresponding first or left-hand ends of the front and rear lower modular rails 51, 52 are best shown in FIG. 15, wherein it will be observed that such ends are closed by respective end plates or caps 51a, 52a having respective pairs of diagonally arranged outwardly projecting pins 51b, 52b thereon, but wherein the positional relationship of the two pins 51b is different from the relative positions of the two pins 52b. In other words, an imaginary line extending through the axes of the two pins 51b in FIG. 15 would extend at an acute angle with respect to a line extending through the axes of the two pins 52b. The reason for the difference in the positional relationship or disposition of the two sets of pins 51b, 52b is to aid a person in assembling the two front and rear lower modular rails 51, 52 in proper relation to each other within the main lower clamping frame 15.

Figure 11:
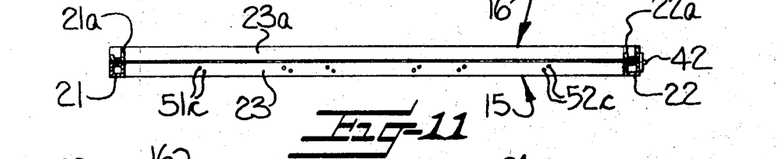

Further in this regard, it will be observed in FIGS. 11 and 13 that the inner wall of the front and rear approximate halves of the left-hand main side rail 23 of lower clamping frame 15 are provided with respective patterns of cavities, apertures or holes therein for matingly releasably receiving the pins 51b or 52b of rails 51, 52. The front portion or half of the latter main side rail 23 is provided with three spaced pairs of holes 51c, and the rear half of the left-hand lower side rail 23 of lower clamping frame 15 has three spaced pairs of holes 52c therethrough. The holes 52c in each pair are disposed in angular relationship with respect to the two holes 51c of each pair in the left-hand or front portion of the corresponding side rail 23 to correspond to the different angular positions in which the pins 51b, 52b are disposed in FIG. 15.

For the purpose of brevity, where certain sets or pairs of holes and/or pins are described herein as being disposed "in angular relationship" with respect to another or other sets or pairs of holes and/or pins, this means that an imaginary line extending through the axes of a certain set or pair of holes and/or pins extends at an angle with respect to an imaginary line extending through the axes of another set or pair of holes and/or pins. Thus, the two holes 51c of each of the three pairs in the forward half of lower main side rail 23 (FIG. 11) are so located relative to each other as to properly selectively receive pins 51b, and the two holes 52c of each of the three pairs in the rearward half of lower main side rail 23 are so located relative to each other and relative to holes 51c as to properly selectively receive pins 52b (FIG. 15) with the desired faces of rails 51, 52 oriented in the desired directions, as will be explained.

Figure 12:
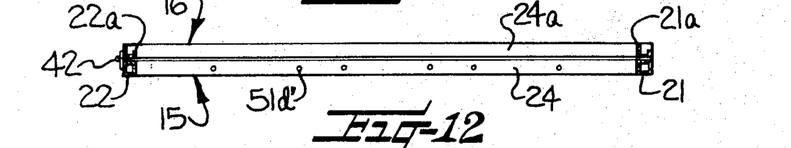

The right-hand main side rail 24 (FIGS. 12 and 13) of lower clamping frame 15 also is provided with a longitudinally extending row of spaced cavities or holes 51d' in its inner wall, there being one of the holes 51d' aligned substantially with each pair of holes 51c, 52c shown in FIG. 11. The holes 51d' are adapted to loosely matingly receive selectively movable latch means or plungers carried by the ends of the lower front and rear modular rails 51, 52 opposite from the pairs of pins 51b, 52b heretofore described.

Figure 6:
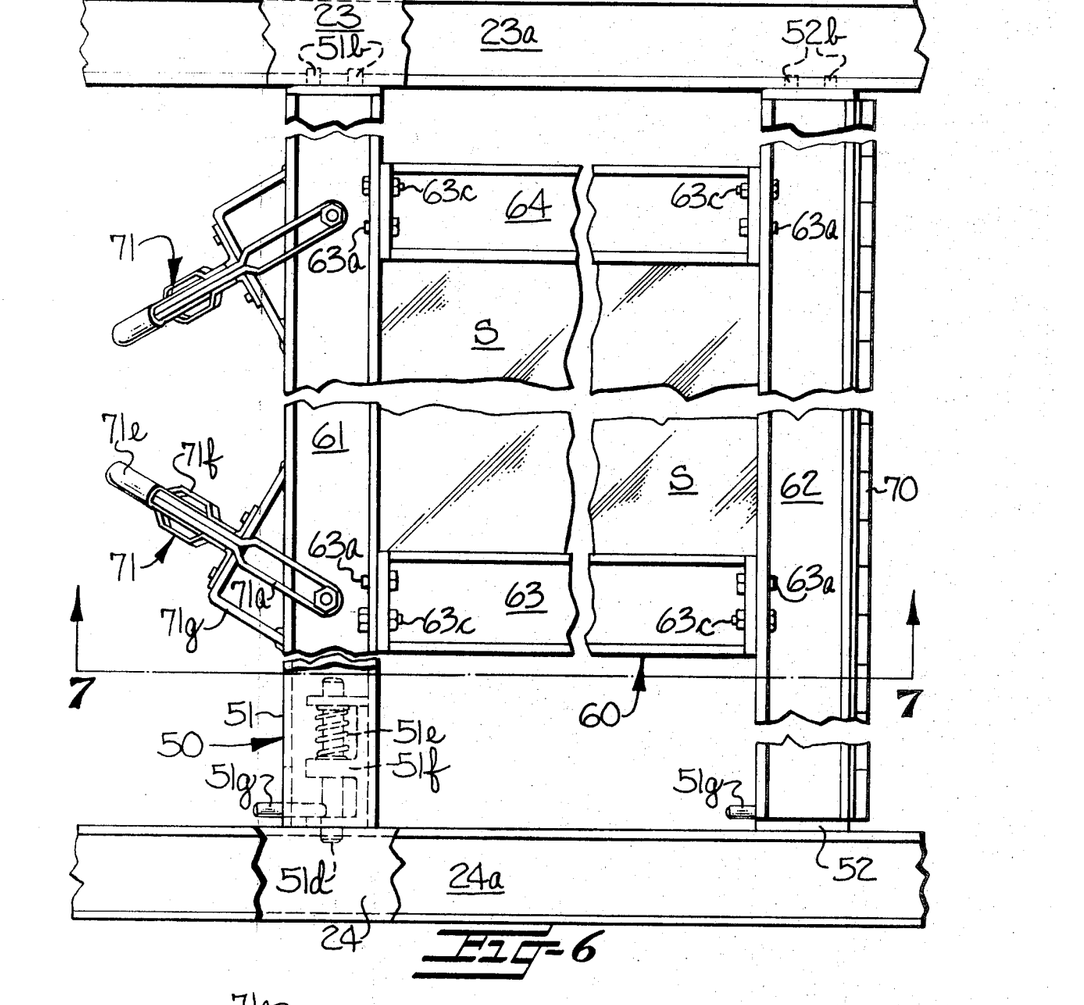
FIG. 6 is an enlarged plan view, with parts broken away, taken substantially along line 6—6 in FIG. 4 and especially illustrating the construction of the auxiliary clamping frames.

Accordingly, as best shown in FIGS. 6 and 13, corresponding ends of the two front and rear lower modular rails 51, 52 are each provided with a longitudinally movable plunger 51d which is suitably guided for longitudinal movement within the corresponding rail and is normally urged outwardly by a suitable spring 51e (FIG. 6). Each plunger 51d may be mounted in a suitable generally U-shaped bracket 51f with the outer leg of the bracket serving as a limiting means to limit the extent to which the corresponding plunger 51d is urged outwardly by the corresponding spring 51e as a radially extending handle 51g carried by plunger 51d engages the latter outwardly positioned leg of the substantially U-shaped bracket 51f. The corresponding end portions of the respective rails 51, 52 are suitably slotted to accommodate the handles 51g so that an operator may readily grasp the handles 51g to retract plungers 51d for installing and removing the corresponding rails from within the lower clamping frame 16.

From the foregoing description, it is apparent that the front and rear bottom modular rails 51, 52 may be positioned in the desired location within the lower clamping frame by positioning the pins 51b, 52b (FIG. 15) thereof in the corresponding desired pairs of holes 51c, 52c shown in FIG. 11 while, at the same time, the plungers 51d at the other ends of the latter rails 51, 52 may be aligned with the desired holes 51d' in the side rail 24 of the lower clamping frame 15, whereupon the operator may release the plungers 51d and they will project into the holes 51d' to hold the front and rear bottom modular rails 51, 52 in the desired predetermined positions.

The longitudinal modular rails 51, 52 of lower auxiliary clamping frame 50 may be of the same cross-sectional shape as the rails 21–24 of lower main clamping frame 15. For example, the lower modular rails 51, 52, as well as lower main rails 21–24 preferably are about 2 inches square in external cross-section, formed of about No. 11 gauge metal, with the holes therein being about three-eighths inch diameter.

Referring again to the pins 51b, 52b on corresponding ends of longitudinal lower modular rails 51, 52 (FIG. 15), these pins should project only a relatively short distance from the capped ends of rails 51, 52; e.g., no more than about one-half inch, so that there may be minimal clearance between the ends of each rail 51, 52 and the main lower side rails 23, 24. Obviously, if pins 51b, 52b project one-half inch from caps 51a, 52b, each longitudinal, lower, modular rail 51, 52, including its respective end cap, would be about one-half inch shorter than the distance between lower main side rails 23, 24. However, once either pair of pins 51b or 52b is inserted in a corresponding pair of holes 51c or 52c in main side rail 23 (FIG. 13), the frictional contact between the respective plunger 51d (FIG. 6) and the wall of the respective hole 51d' (FIG. 12), as well as the weight of each modular rail 51, 52, insure that the pins 51b, 52b will not be withdrawn from the selected sets of holes 51c, 52c unintentionally.

Figure 7:
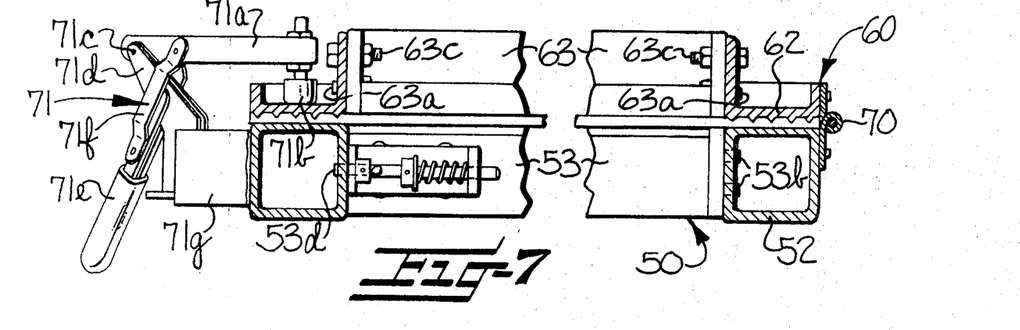
FIG. 7 is a vertical sectional view taken substantially along line 7—7 in FIG. 6.
Figure 9:
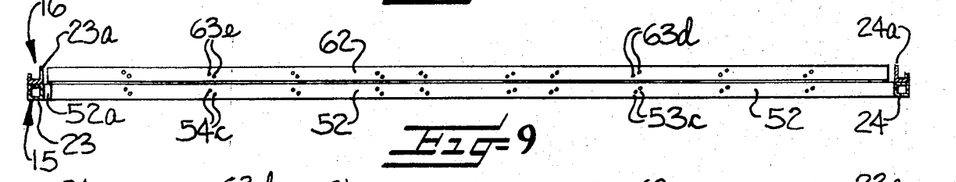
FIGS. 9–12 are views looking generally in the directions of the respective arrows 9–12 in FIG. 8.

The lower transverse modular rails 53, 54 are preferably in the form of angle bars and have respective pairs of angularly positioned outwardly projecting pins on the capped rear ends thereof, only the pins on the rear end of lower transverse modular rail 53 being shown at 53b in FIG. 7. The pins on the right-hand and left-hand lower modular transverse rails 53, 54 may be arranged in exactly the same manner as the pins 51b, 52b are arranged on the respective front and rear lower modular rails 51, 52 in FIG. 15. Accordingly, a detailed illustration of the rear ends of both of the lower transverse modular rails 53, 54 shown in FIGS. 6 and 13 is deemed unnecessary. Of course, it is apparent that the front wall of the rear bottom modular rail 52 in FIG. 9 is provided with several pairs of holes spaced along its length with the holes 53c along approximately the right-hand half of the rail 52 shown in FIG. 9 extending in a different angular relationship than those holes 54c in the left-hand half of the lower rear modular rail 52 in FIG. 9, for essentially the same reasons as given with respect to the holes 51c, 52c shown in FIG. 11.

The front end portion of each transverse lower modular rail 53, 54 is provided with a suitable manually operable, spring loaded plunger 53d (FIGS. 7 and 13) which may be constructed in the same manner as the plunger 51d shown in FIG. 6. Accordingly, a further detailed description of the spring loaded plunger 53d is deemed unnecessary. It should be noted that the lower front modular rail 51 is provided with a longitudinally extending row of spaced-apart apertures 53e in the rear wall thereof (FIG. 10), there being one of the apertures 53e provided for each of the pairs of holes 53c, 54c of FIG. 9 so as to hold the corresponding lower transverse modular rails 53, 54 in the desired predetermined positions between front and rear lower modular rails 51, 52.

The pair of pins 51b (FIG. 15) on one end of lower front modular rail 51 and each pair of holes 51c in lower left-hand main side rail 23 (FIGS. 11 and 13) are arranged at a different angle or in a different pattern than pins 52b and holes 52c to insure that rail 51 always is properly positioned forwardly of rail 52. This is desirable because holes 53c, 54c (FIG. 9) are formed in the front wall only of tubular lower rear modular rail 51, and holes 53e (FIG. 10) are formed in the rear wall only of tubular lower front modular rail 51.

Also, to facilitate the use of hand-operated clamps, such as conventional "C-clamps" C (FIG. 13) along the respective pairs of transverse modular rails 53, 63 and 54, 64, it is desirable that the latter rails are in the form of angle bars with their proximal web portions or flanges facing outwardly away from the plastic sheet 11 and being clamped between the lower modular rails 51–54 and the complementary upper modular rails 61–64. Thus, it is not only desirable to have the pins 51b, 52b and holes 51c, 52c arranged as described, but it is also desirable to have the pair of pins 53b of the lower transverse modular rail 53 (FIG. 7) and each pair of holes 53c (FIG. 9) in lower rear modular rail 52 arranged in a different pattern or angular relationship than that of those pins 53b in rail 54 and each pair of holes 54c.

It will be observed in FIGS. 6, 7 and 13 that the rear lower edge of rear modular rail 62 of upper auxiliary clamping frame 60 is pivotally connected to lower rear modular rail 52, as by means of a hinge or hinges 70. The upper front modular rail 61 is in the form of an angle bar with its horizontal bottom flange facing downwardly to accommodate a row of hand-operated clamps 71 (FIGS. 6, 7 and 8) carried by the lower front modular rail 51. The hand-operated clamps 71 may be identical to the hand-operated clamps 45 heretofore described. In the embodiment shown in FIGS. 6 and 7, each clamp 71 comprises an upper pivoted clamp arm 71a having a suitable pad 71b adjustably mounted on its free end for engagement with the upper surface of the horizontal flange of the upper front modular rail 61. Arm 71a is pivotally mounted, as at 711c, on an angularly disposed clamping bracket 71d, to a medial portion of which a handle 71e is pivotally connected. A toggle link 71f connects a medial portion of clamping arm 71a to a medial portion of handle 71f and each of the brackets 71d is secured, as by an angle plate 71g to the lower front modular rail 51. It is apparent that, when the pivot points of the toggle links 71f are substantially aligned with the pivot point of handle 71e, the clamp arm 71a and its pad 71b apply downward pressure to the upper front modular rail 61. Conversely, when the operator swings the handle 71e in FIG. 7 in a clockwise direction, the clamp arm 71a and its pad 71b are free to move upwardly to release the upper front modular rail 61 so that the upper auxiliary frame 60 may be tilted upwardly and rearwardly about the hinge 70 by the operator.

Since the main rails 21a–24a of upper clamping frame 16, the upper front and rear modular rails 61, 62 and upper transverse modular rails 63, 64 are preferably formed of an extruded metal, such as an aluminum alloy, it is preferred that all of the latter rails are of the same cross-sectional configuration. To accommodate the upper transverse modular rails 63, 64 between the upper front and rear modular rails 61, 62, it is desirable that the upwardly projecting flanges of both the upper front and rear modular rails 61, 62 are positioned along the proximal edges of rails 61, 62, as best shown in FIG. 13.

The upper transverse modular rails 63, 64 must be rigidly secured to the upper front and rear modular rails 61, 62 so that the entire sub-assembly or upper auxiliary clamping frame 60 may be pivoted upwardly with the upper rear modular rail 62 and about the hinge 70 relative to main clamping frames 15, 16 and lower auxiliary clamping frame 50. To facilitate assembling rails 61–64 after rail 52 (along with rail 62 hingedly connected thereto) has been installed between the main side rails 23, 24 of lower clamping frame 15, the opposite ends of each upper transverse rail 63, 64 are suitably capped, and each such capped end is provided with an outwardly projecting offset guide pin 63a adjacent the juncture of the two flanges of each rail 63, 64. Additionally, each capped end has an aperture 63b therethrough (FIG. 14) for reception of a corresponding bolt 63c (FIGS. 7 and 13) therethrough.

It is apparent therefore that, when the outer faces of the vertical flanges of the upper transverse modular rails 63, 64 face each other as shown in FIG. 13, an imaginary line extending through the centers of the pin 63a and aperture 63b in the front end of rail 63 would extend at an angle with respect to a corresponding line extending through the centers of that pin 63a and aperture 63b in the front end of the adjacent rail 64. Accordingly, to insure that the free edges of the bottom flanges of the upper transverse modular rails 63, 64 face outwardly away from each other, and, thus, away from the plastic sheet S being clamped between the upper and lower modular units, the opposing halves of the vertical flanges of each upper front and rear modular rail 61, 62 are provided with respective pairs of apertures or holes 63d, 63e (FIG. 10) therethrough which are of a size corresponding substantially to the pin 63a and the bolt 63c on each end of each upper transverse modular rail 63, 64.

It is important to note that the pairs of holes 63d formed in one half of each of the rails 61, 62 are arranged in a slightly different pattern than those holes 63e appearing in the other half of the corresponding rails 61, 62. More specifically, an imaginary line extending through the centers of adjacent holes 63d in each pair would extend at an acute angle with respect to an imaginary line extending through the centers of the holes of each pair 63e appearing in the opposite half of the corresponding rail 61, 62.

Figure 8:
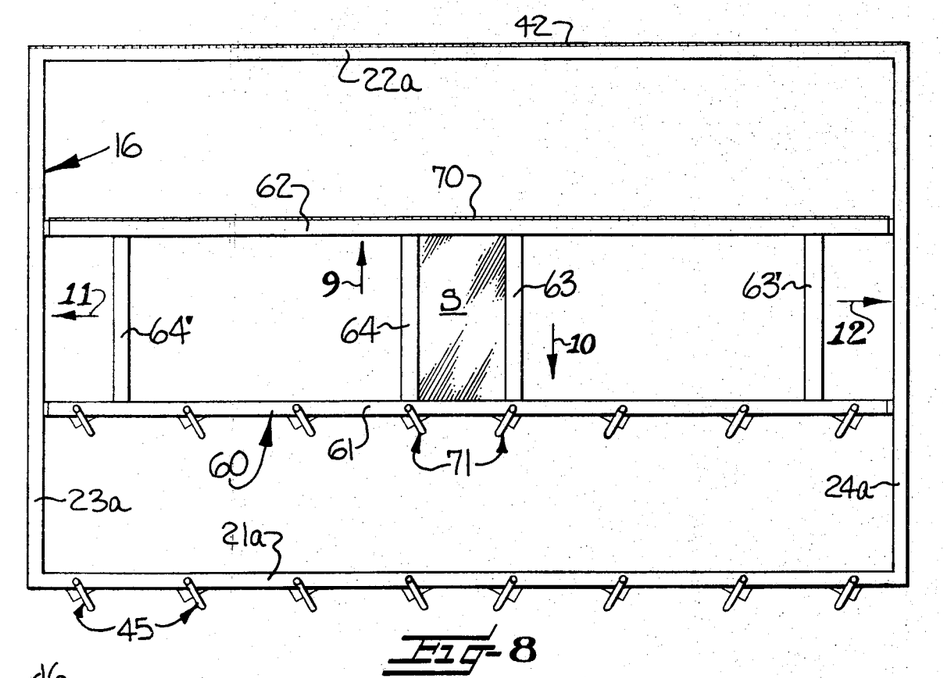
FIG. 8 is a schematic plan view of the clamping frame assembly removed from the vacuum forming machine.

If desired, additional transverse rails may be provided which correspond to the lower transverse rails 53, 54 and the upper transverse rails 63, 64 positioned between the respective pairs of front and rear modular rails 51, 52, 61, 62. By way of example, two additional rails 63', 64' are shown in FIG. 8 positioned between outer portions of the upper front and rear modular rails 61, 62. Accordingly, a further description of such additional transverse rails is deemed unnecessary, it being understood that the additional lower and upper transverse rails would be constructed and attached to the corresponding front and rear rails in exactly the same manner as that described with respect to the transverse rails 53, 54, 63, 64.

Further, instead of utilizing rear longitudinal modular rails 52, 62, it is contemplated that in some instances upper rear main rail 22a may be arranged with its wide upper flange facing forwardly and that both rear main rails 22, 22a may be perforated in the manner of the respective modular rails 52, 62 in FIG. 9 to accommodate the rear ends of the transverse modular rails 53, 54, 63, 64. In such an arrangement it is apparent that both upper clamping frames 16, 60 would be raised and lowered about hinge 42 in a unitary manner. As disclosed in my said Pat. No. 3,659,991, it is preferred that the lower clamping surface of each upper rail of the clamping frame assembly is serrated to provide longitudinal ridges projecting therefrom to tightly grip any plastic sheet portions positioned between the same and a corresponding lower rail of the clamping frame assembly.

Figure 10:
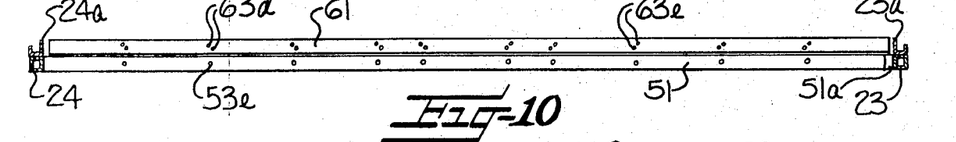

It is thus seen that I have provided an improved clamping frame assembly readily adapted to accommodate many different sizes of plastic sheets to be formed. For example, a large number of prefabricated transverse modular rails 53, 54, 63, 64 may be stored in various lengths and, by installing the front and rear modular rails 51, 52 at selected locations with respect to the main side rails 23, 24 and as determined by the locations of the holes 51c, 52c, 51d', transverse modular rails 53, 54, 63, 64 of the desired lengths may be installed between the respective lower front and rear modular rails 51, 52 and between the respective upper front and rear modular rails 61, 62. If the dimensions of different plastic sheets to be accommodated vary only in a direction prallel to the front and rear rails of the clamping frames, it is apparent that it is only necessary then to install the transverse modular rails 53, 54, 63, 64 (FIGS. 13 and 14) in the desired preselected positions along the lengths of the corresponding front and rear modular rails 51, 52, 61, 62, as determined by the location of the pairs of holes 53c, 54c in rail 52 (FIG. 9), the pairs of holes 63d, 63e in each of the rails 61, 62 (FIGS. 10 and 9, respectively), and the location of the holes 53e in the lower front modular rail 51 (FIG. 10).

In a typical apparatus constructed according to the invention, the main clamping frames 15, 16 were about 6 feet wide and 10 feet long to accommodate a large plastic sheet of corresponding size. With the pins 51b, 52b on the left-hand ends of front and rear lower modular rails 51, 52 (FIGS. 6 and 15) positioned in the centermost pairs of holes 51c, 52c in rail 23 (in FIG. 11), with the pairs of pins 53b (FIG. 7) on the rear ends of lower transverse modular rails 53, 54 positioned in the centermost pairs of holes 53c, 54c in rail 52 (FIG. 9), and with the pin-and-hole sets 63a, 63b (FIG. 14) at opposite ends of upper transverse modular rails 63, 64 aligned with the centermost pairs of holes 63d, 63e in rails 61, 62 (FIGS. 9 and 10), a plastic sheet only twelve inches square could be accommodated and clamped between the lower and upper auxiliary clamping frames 50, 60. Conveniently, the other pairs of holes 63d, 63 e (FIGS. 9 and 10), spaced from opposite sides of the centermost pairs, were arranged to accommodate respective plastic sheets of 2, 4, 6, and 8 foot dimensions measured parallel to rails 51, 52, 61, 62. Similarly, the other pairs of holes 51c, 52c in rail 23 (FIG. 11), spaced from opposite sides of the centermost pairs, and the complementing holes 51d' in rail 24 were arranged to accommodate respective plastic sheets of 2 and 4 foot dimensions measured parallel to rails 23, 24.

It is thus seen that I have provided an improved clamping frame assembly having modular rail components which may be readily selectively positioned in the main clamping frames of the assembly so as to accommodate a wide range of different sizes of plastic sheets therein. It is seen further that I have provided improved means for raising and lowering the clamping frame assembly formed of the clamping frames 15, 16, 50, 60 relative to the forming die 11 and the vacuum table 10 and utilizing fluid pressure means so as to eliminate the need for gearing, such as racks and pinions, for raising and lowering the clamping frame assembly.

In the drawings and specification there has been set forth a preferred embodiment of the invention and, although specific terms are employed, they are used in a generic and descriptive sense only and not for purposes of limitation.

That which is claimed is:

1. In a vacuum forming machine for molding a thermoplastic sheet about a suitable die and including a vacuum table adapted to support a die thereon and heating means positioned above said table and defining an oven adjacent which the plastic sheet is positioned for heating prior to forming; the combination therewith of a clamping frame assembly for securely supporting different sizes of thermoplastic sheets therein, one at a time, during heating and forming; said clamping frame assembly comprising a pair of complementary first and second substantially rectangular main clamping frames, means pivotally interconnecting said main clamping frames adjacent one edge portion thereof, a pair of complementary first and second auxiliary clamping frames within the respective first and second main clamping frames, said auxiliary clamping frames each comprising a first pair of front and rear spaced substantially parallel modular rails, and a second pair of spaced substantially parallel modular rails secured to and extending transversely of and between said first pair of rails, means releasably securing opposite ends of said first pair of modular rails of said first auxiliary clamping frame to opposite side portions of said first main clamping frame, means pivotally connecting said rear modular rail of said second auxiliary clamping frame to the adjacent rear modular rail of said first auxiliary clamping frame so that said second auxiliary clamping frame is movable about its pivot relative to said first auxiliary clamping frame and relative to both of said main clamping frames, and means for releasably clamping said first and second auxiliary clamping frames together for clampingly securing a thermoplastic sheet therebetween.

2. A vacuum forming machine according to claim 1, including means matingly releasably connecting one end portion of at least one of the rails of one of said second pairs to a respective one of the rails of the corresponding first pair, the other rail of said corresponding first pair having at least one cavity therein, and movable latch means carried by the other end portion of said one rail of said one second pair and adapted to fit in said cavity for releasably maintaining said last-named other end portion in predetermined relation to said other rail of said corresponding first pair.

3. A vacuum forming machine according to claim 1, including a pair of of pins projecting from one end of each of said second modular rails of said first auxiliary clamping frame, a corresponding one of said first modular rails having a plurality of pairs of apertures therein for selectively receiving corresponding pairs of said pins projecting from said last-named second rails, the other end of each last-named second rail having a longitudinally movable plunger thereon, and the other of said first modular rails of said first auxiliary clamping frame having a row of cavities therein for selectively receiving therein said plungers on said second rails of said first auxiliary clamping frame.

4. A vacuum forming machine according to claim 3, wherein each of said last-named second rails comprises an angle bar having substantially vertical and substantially horizontal flanges extending longitudinally thereof, said vertical flanges of said last-named second rails facing inwardly toward each other, each of said pairs of apertures in about one-half the length of said first modular rail of said first auxiliary clamping frame having a different positional relationship than each of said pairs of apertures in the other half of the length of the last-named first rail, the pair of pins of one of said last-named second rails also having a different positional relationship than the pair of pins of the other last-named second rail, and the positional relationship of the pairs of pins of said one and said other last-named second rails corresponding to that of the pairs of apertures in the respective one and other halves of the length of the last-named first rail.

5. In a vacuum forming machine for molding a thermoplastic sheet about a suitable die and including a vacuum table adapted to support a die thereon, and heating means positioned above said table and defining an oven adjacent which the plastic sheet is positioned for heating prior to forming; the improvement comprising a clamping frame assembly for securely supporting a thermoplastic sheet during heating and forming comprising upper and lower complementary substantially rectangular clamping frames adapted to clamp edge portions of a thermoplastic sheet therebetween, each frame including main front and rear rails, a pair of main opposing side rails connected to said front and rear rails, and means pivotally interconnecting said rear rails of said upper and lower frames, a plurality of modular structural members for adapting said rectangular clamping frames to accommodate smaller thermoplastic sheets therein of less area than the area encompassed by said rectangular clamping frames, said modular structural members comprising first and second lower modular rails for said lower clamping frame, means for releasably connecting each of said first and second lower modular rails to said lower clamping frame so as to extend between said main side rails and substantially parallel with said main front and rear rails and including a. means releasably connecting one end portion of each of said first and second lower modular rails to the inner surface of one of said main side rails of said lower clamping frame, b. a plurality of cavities in the inner surface of the opposite main side rail of said lower clamping frame, and c. movably latch means carried by the other end portion of each of said first and second lower modular rails, each of said latch means being adapted to fit in one of said cavities for releasably maintaining the associated lower modular rail in predetermined relation with respect to said opposite main side rail of said lower clamping frame, a pair of transverse lower modular rails extending transversely between said first and second lower modular rails, means detachably connecting opposite ends of said transverse lower modular rails to proximal surfaces of said first and second lower modular rails, first and second upper modular rails, means pivotally connecting said second upper modular rail to said second lower modular rail, a pair of transverse upper modular rails extending between and connected to said first and second upper modular rails such that said first and second upper rails and said pair of transverse upper rails respectively overlie said first and second lower modular rails and said pair of transverse lower modular rails, and means carried by said clamping frame for releasably clamping said upper modular rails toward said lower modular rails for clamping portions of a thermoplastic sheet therebetween.

6. A vacuum forming machine according to claim 5 wherein said means releasably connecting one end portion of each of said first and second lower modular rails to the inner surface of one of said main side rails includes a pair of pins projecting from said one end portion of each of said first and second lower modular rails, and a plurality of longitudinally spaced pairs of apertures in the inner surface of said one of said main side rails for selectively matingly receiving said pair of pins therein.

7. A vacuum forming machine according to claim 5 wherein said means releasably connecting one end portion of each of said first and second lower modular rails to the inner surface of one of said main side rails includes a pair of pins projecting from said one end portion of each of said first and second lower modular rails with the pair of pins of said first lower modular rail having a positional orientation different from that of the pair of pins of said second lower modular rail, and a plurality of longitudinally spaced pairs of apertures in said inner surface of said one of said main side rails for selectively matingly receiving said pair of pins therein and with each of said pairs of apertures in about a first half of the length of said one main side rail having a positional orientation different from that of the pairs of apertures in about the second half of the length of said one main side rail, said positional orientation of said pairs of pins of said first and second lower modular rails corresponding to that of the pairs of apertures in the respective first and second halves of the length of said one main side rail.

* * * * *